(12) United States Patent
Nakamura et al.

(10) Patent No.: US 9,606,549 B2
(45) Date of Patent: Mar. 28, 2017

(54) POPPET VALVE

(71) Applicants: KAYABA INDUSTRY CO., LTD., Minato-ku, Tokyo (JP); TOKYO INSTITUTE OF TECHNOLOGY, Meguro-ku, Tokyo (JP)

(72) Inventors: Yoshinari Nakamura, Kanagawa (JP); Kiyokazu Nagata, Tokyo (JP); Toshiharu Kagawa, Tokyo (JP); Chongho Youn, Tokyo (JP)

(73) Assignees: KYB Corporation, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 38 days.

(21) Appl. No.: 14/381,983

(22) PCT Filed: Mar. 15, 2013

(86) PCT No.: PCT/JP2013/057546
§ 371 (c)(1),
(2) Date: Aug. 28, 2014

(87) PCT Pub. No.: WO2013/137467
PCT Pub. Date: Sep. 19, 2013

(65) Prior Publication Data
US 2015/0059879 A1    Mar. 5, 2015

(30) Foreign Application Priority Data

Mar. 15, 2012   (JP) ................................. 2012-059446

(51) Int. Cl.
*F16K 31/12*     (2006.01)
*G05D 16/10*    (2006.01)
(Continued)

(52) U.S. Cl.
CPC ............... *G05D 16/10* (2013.01); *F16K 1/42* (2013.01); *F16K 47/02* (2013.01); *F16K 47/04* (2013.01);
(Continued)

(58) Field of Classification Search
CPC ........ F16K 1/38; F16K 25/00; F16K 27/0254; Y10T 137/7793; Y10T 137/7809;
(Continued)

(56) References Cited

U.S. PATENT DOCUMENTS 1,984,592 A * 12/1934 MacLean ........... G05D 16/0647
                                                    137/505.41
2,380,459 A *  7/1945 Fritz
                         Niesemann ........ G05D 16/0655
                                                     137/315.05
(Continued)

FOREIGN PATENT DOCUMENTS

EP    0043310 A1    1/1982
GB    2114269 A     8/1983
(Continued)

OTHER PUBLICATIONS

International Search Report and Written Opinion mailed Apr. 16, 2013, corresponding International Application No. PCT/JP2013/057546.
(Continued)

*Primary Examiner* — R.K. Arundale
(74) *Attorney, Agent, or Firm* — Hauptman Ham, LLP

(57) ABSTRACT

A poppet valve is provided with a seat portion which has a conical inner peripheral surface with a center axis, and a conical portion which is displaced along the center axis inside the seat portion, forms a flow passage having an annular cross-section between the conical portion and the seat portion and is supported at a position concentric with (Continued)

the seat portion. An effect of rectifying fluid flowing in the flow passage is thereby obtained and the generation of noise is prevented.

14 Claims, 3 Drawing Sheets

(51) Int. Cl.
| | |
|---|---|
| *H01M 8/04082* | (2016.01) |
| *F16K 47/04* | (2006.01) |
| *H01M 8/04* | (2016.01) |
| *F16K 47/02* | (2006.01) |
| *F16K 1/42* | (2006.01) |

(52) U.S. Cl.
CPC ......... *H01M 8/04* (2013.01); *H01M 8/04201* (2013.01); *Y02E 60/50* (2013.01); *Y10T 137/7804* (2015.04); *Y10T 137/7809* (2015.04); *Y10T 137/7823* (2015.04)

(58) Field of Classification Search
CPC ........... Y10T 137/782; Y10T 137/7821; Y10T 137/7822; Y10T 137/7825; Y10T 137/7826; Y10T 137/7835
See application file for complete search history.

(56) References Cited

U.S. PATENT DOCUMENTS

| | | | | |
|---|---|---|---|---|
| 5,685,492 A | * | 11/1997 | Davis | .................. F02M 61/08 239/533.12 |
| 6,170,519 B1 | * | 1/2001 | Carroll | .................. G05D 16/10 137/505 |
| 6,173,912 B1 | * | 1/2001 | Gottlieb | ................. F02M 61/08 239/533.12 |
| 6,328,054 B1 | | 12/2001 | Martin et al. | |
| 2002/0083980 A1 | * | 7/2002 | Nakajima | .......... G05D 16/0663 137/505.41 |
| 2007/0289638 A1 | | 12/2007 | Ishitoya et al. | |
| 2009/0308465 A1 | * | 12/2009 | Suzuki | ................ F16K 27/0254 137/317 |
| 2011/0308643 A1 | | 12/2011 | Ishitoya et al. | |
| 2013/0008530 A1 | | 1/2013 | Ishitoya et al. | |

FOREIGN PATENT DOCUMENTS

| | | |
|---|---|---|
| JP | 529119 A | 1/1977 |
| JP | 2-12572 U | 1/1990 |
| JP | 2201511 A | 8/1990 |
| JP | 10169792 A | 6/1998 |
| JP | 10167 U | 8/1998 |
| JP | 2006172123 A | 6/2006 |
| JP | 2008-25734 A | 2/2008 |
| JP | 201026825 A | 2/2010 |
| WO | 01/81801 A2 | 11/2001 |

OTHER PUBLICATIONS

Office Action issued Jun. 11, 2015, corresponding to Korean patent application No. 10-2014-7023192.

* cited by examiner

POPPET VALVE

TECHNICAL FIELD

This invention relates to a structure of a poppet valve for controlling a pressure of fluid.

BACKGROUND ART

A pressure-reducing valve for supplying fuel gas having a primary pressure introduced from a fuel tank to a fuel cell while reducing the primary pressure to a predetermined secondary pressure is used in a fuel cell system.

JP10-169792 A published by the Japan Patent Office in 1998 proposes a pressure-reducing valve designed for a large flow of high-pressure fuel gas. The valve comprises a plurality of plates and elastic spacers alternately laminated to form slits between the plates.

JP2010-026825 A published by the Japan Patent Office proposes a poppet-type pressure-reducing valve. This pressure-reducing valve comprises a valve seat for allowing the passage of gas and a poppet-like valve body facing this valve seat so as to define a throttled flow passage there-between.

SUMMARY OF INVENTION

In pressure-reducing valves to be provided in a flow passage for a large flow of high-pressure gas, including the pressure-reducing valve according to the above prior arts, a swirl is generated downstream of a part where the flow of the high-pressure gas is throttled and high-frequency noise is thereby generated from the gas flow.

It is therefore an object of this invention to prevent noise generation in a pressure-reducing valve due to a flow of high-pressure gas.

In order to achieve the above object, this invention provides a poppet valve, comprising a seat portion which has a conical inner peripheral surface with a center axis, and a conical portion which is supported at a position concentric with the seat portion and displaces in a direction along the center axis inside the seat portion while forming a flow passage having an annular cross-section between the conical portion and the seat portion.

The details as well as other features and advantages of this invention are set forth in the remainder of the specification and are shown in the accompanying drawings.

DESCRIPTION OF EMBODIMENT

Figure 1:
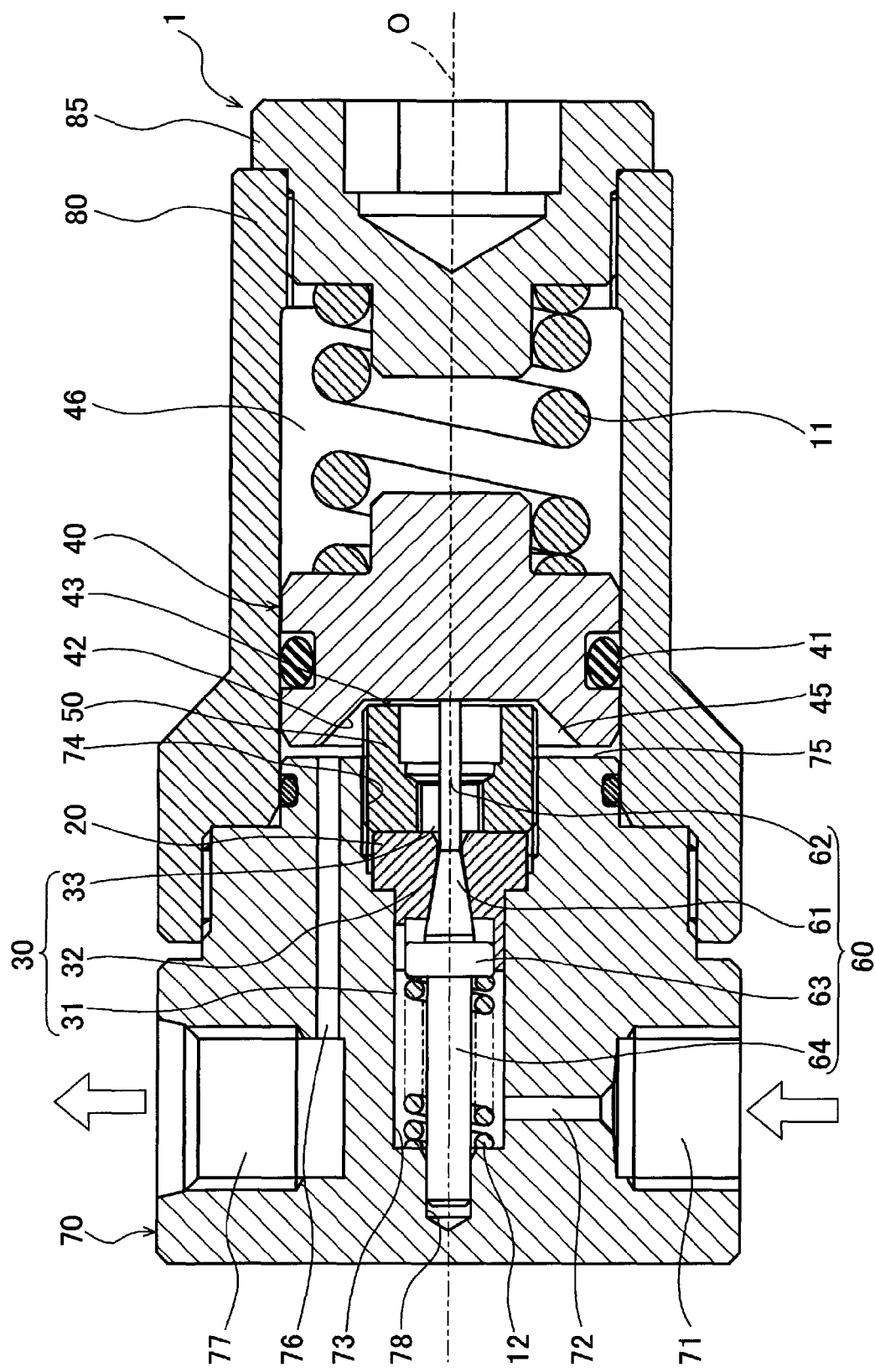
FIG. 1 is a longitudinal sectional view of a poppet valve according to an embodiment of this invention.

Referring to FIG. 1 of the drawings, a poppet valve 1 is used in a fuel cell system to supply fuel gas of, e.g. 30 to 70 megapascals (MPa) in a fuel tank to a fuel cell while reducing a pressure thereof to a pressure of several MPa. Hydrogen gas is herein used as the fuel gas. The poppet valve 1 is not limited to use for hydrogen gas and can be used to adjust a pressure of fluid also in other apparatuses and facilities using other gas or liquid.

The poppet valve 1 comprises a valve seat 20 having an annular cross-section and formed in a central part with a through hole for allowing the passage of gas, a valve body 60 for rectifying the flow of the gas by being displaced in an axial direction in the through hole of the valve seat 20, a piston 40 for driving the valve body 60 by a gas pressure at a side downstream of the valve seat 20, a spring 11 for biasing the valve body 60 in a valve opening direction and a spring 12 for biasing the valve body 60 in a valve closing direction against a biasing force of the spring 11. The piston 40 and the valve body 60 are coupled and integrally displaced.

When the poppet valve 1 is actuated, the piston 40 and the valve body 60 are displaced in a horizontal direction of the figure according to a gas pressure introduced from a fluid supply source and a cross-sectional area of a gas flow passage between the valve body 60 and the valve seat 20 varies, whereby the pressure of the fuel gas supplied to the fuel cell is reduced to a set pressure.

The poppet valve 1 comprises a valve housing 70 and a piston housing 80. The valve seat 20, the valve body 60 and the spring 12 are arranged in the valve housing 70.

The poppet valve 1 comprises a primary port 71 which is open on the valve housing 70, a poppet passage 30 in which the valve body 60 is accommodated, a control pressure chamber 45 which is defined by the piston 40 and a secondary port 77 which is open on the valve housing 70.

The fuel gas supplied from the fluid supply source flows into the primary port 71 as indicated by an arrow in the figure. In the poppet valve 1, the fuel gas flows from the primary port 71 into the poppet passage 30 through a through hole 72. A gas pressure of the fuel gas passing through the poppet passage 30 is reduced because the flow passage is throttled between the valve seat 20 and the valve body 60. The fuel gas having passed through the poppet passage 30 flows into the control pressure chamber 45. The piston 40 displaces the valve body 60 so that the gas pressure in the control pressure chamber 45 becomes the set pressure. The fuel gas having passed through the control pressure chamber 45 passes through a through hole 76 and is supplied from the secondary port 77 to the fuel cell.

The poppet passage 30 comprises a poppet upstream flow passage 31 communicating with the primary port 71, a throttled flow passage 32 defined between the valve seat 20 and the valve body 60 and a poppet downstream flow passage 33 allowing communication between the throttled flow passage 32 and the control pressure chamber 45.

Figure 2:
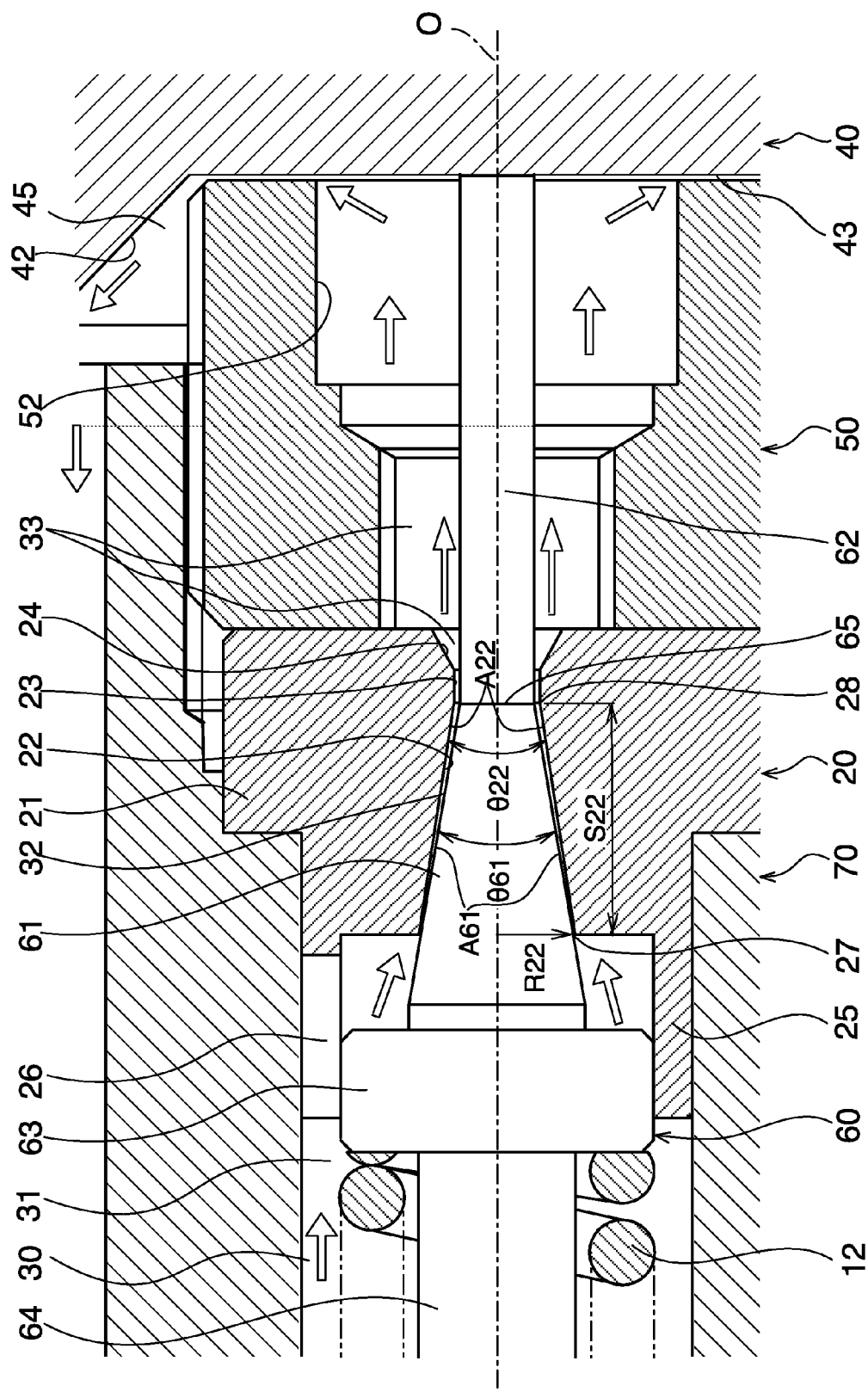
FIG. 2 is an enlarged longitudinal sectional view showing an essential parts of the poppet valve.

Referring to FIG. 2, the valve body 60 comprises a conical portion 61. On the other hand, the valve seat 20 comprises, as parts defining the poppet passage 30, a seat portion 22 having a conical inner peripheral surface facing the conical portion 61, a cylindrical passage portion 23, and an exit portion 24 including a conical inner peripheral surface with a diameter gradually increased from the passage portion 23 toward the poppet downstream flow passage 33.

The valve body 60 comprises a rod 62 extending from the tip of the conical portion 61 and coupled to the piston 40. A space between the rod 62 and the passage portion 23 of the valve seat 20 and a space between the rod 62 and the exit portion 24 of the valve seat 20 forms an upstream part of the poppet downstream flow passage 33.

The throttled flow passage 32 is formed between the seat portion 22 and the conical portion 61. The throttled flow passage 32 is closed by the conical portion 61 being seated on the seat portion 22, and opened by the valve body 60 being displaced in a leftward direction in the figure to lift the conical portion 61 from the seat portion 22.

The inner peripheral surface of the seat portion 22 and the outer peripheral surface of the conical portion 61 have a common center axis O.

FIGS. 1 and 2 show longitudinal cross-sections of the poppet valve 1 cut along a plane including the center axis O. On these longitudinal cross-sections, an angle θ22 formed by two straight lines A22 indicating the inner peripheral surface of the seat portion 22 is equivalent to an apex angle of the conical inner peripheral surface of the seat portion 22. Similarly, an angle θ61 formed by two straight lines A61 indicating the outer peripheral surface of the conical portion 61 is equivalent to an apex angle of the outer peripheral surface of the conical portion 61. Herein, the angle θ61 is set larger than the angle θ22 by a predetermined angle or more. The predetermined angle is a value required to increase a cross-sectional area of the throttled flow passage 32 gradually toward a downstream side.

By the above setting, the width of the throttled flow passage 32 formed between the inner peripheral surface of the seat portion 22 and the outer peripheral surface of the conical portion 61 gradually increases from an upstream side toward the downstream side. The cross-sectional area of the throttled flow passage 32 also gradually increases from the upstream side toward the downstream side.

The seat portion 22 denotes a section from an edge portion 27 corresponding to an upstream end and an end portion 28 corresponding to a downstream end. The conical portion 61 is seated on the edge portion 27, whereby communication between the poppet upstream flow passage 31 and the throttled flow passage 32 is blocked. The end portion 28 is a boundary between the passage portion 23 and the seat portion 22.

The seat portion 22 is so formed that the end portion 28 faces a tip 65 of the conical portion 61 substantially at the same position as the tip 65 with respect to a direction of the center axis O at a minimum opening of the poppet valve 1, i.e. when the poppet valve 1 is closed. The tip 65 of the conical portion 61 is a boundary between the conical portion 61 and the rod 62. By this setting, the throttled flow passage 32 is constantly formed up to the vicinity of the rod 62 in a state where fuel gas can flow, i.e. the conical portion 61 is at least slightly displaced to the left side in the figure. By this setting, the length of the throttled flow passage 32 is ensured in a state where the poppet valve 1 is operating as a pressure-reducing valve.

The seat portion 22 is so formed that a ratio of a length S22 to a maximum radius R22 is a predetermined ratio or higher. The length S22 of the seat portion 22 is a length from the edge portion 27 to the end portion 28 in the direction of the center axis O. The maximum radius R22 of the seat portion 22 is a distance from the center axis O to the edge portion 27.

Figure 3:
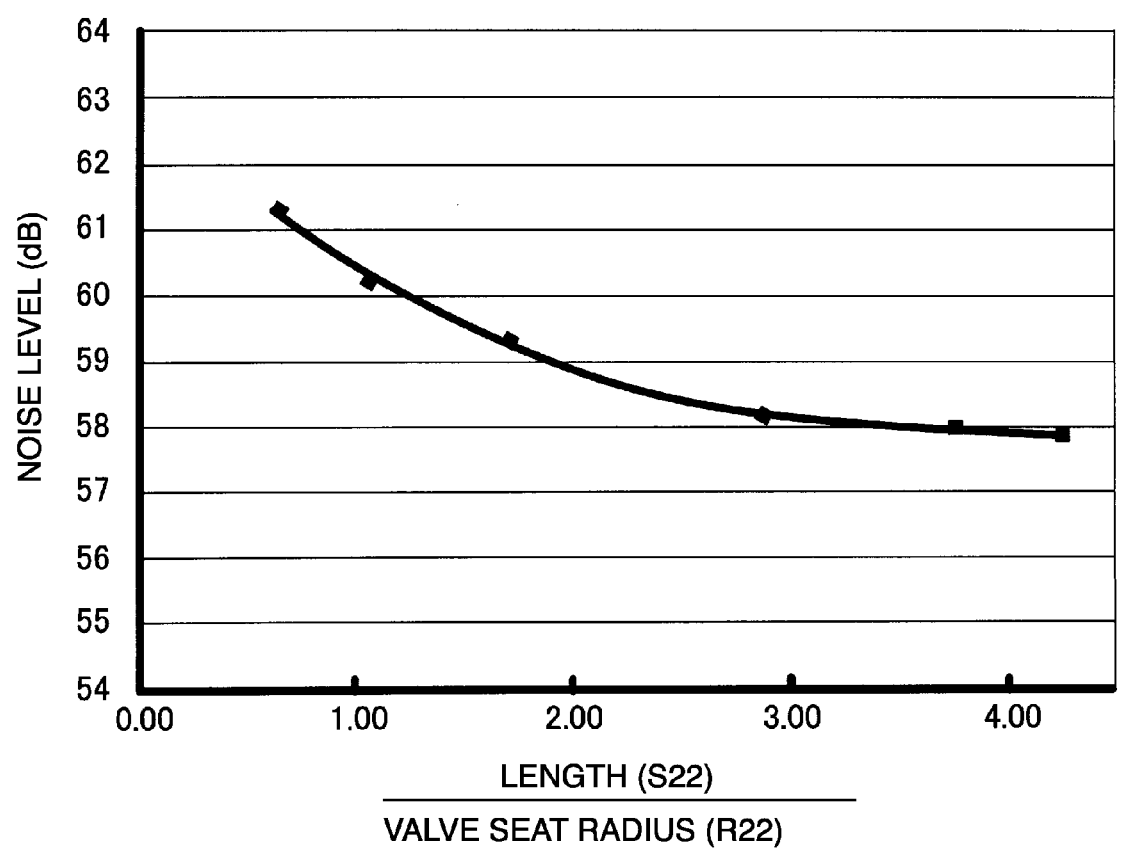
FIG. 3 is a diagram showing a characteristic of a measurement result of a noise level generated from the poppet valve.

The inventors measured a change in noise generated by the poppet valve 1 by changing a ratio S22/R22 of the length S22 of the seat portion 22 to the maximum radius R22 of the seat portion 22. As a result of the measurement, a diagram shown in FIG. 3 is obtained. It can be understood from the diagram that the level of the noise generated by the poppet valve 1 is effectively reduced if the ratio S22/R22 is set at unity or higher. Further, considering this experimental result and dimensions of the poppet valve 1, it is preferable to set the ratio S22/R22 in a range of from 1 to 4.

Referring to FIG. 1, the valve hosing 70 is formed with a passage hole 73 which defines the poppet upstream flow passage 31 and a large-diameter screw hole 74 which is connected to the passage hole 73 and open on an end surface 75 of the valve housing 70. The passage hole 73 and the screw hole 74 are concentrically formed with respect to the center axis O.

Referring again to FIG. 2, the valve seat 20 comprises a cylindrical guide sleeve 25 fitted in the passage hole 73, and a disk-shaped partitioning portion 21 seated on a bottom part of the screw hole 74. The valve seat 20 is fixed to the valve housing 70 by a plug 50 threaded into the screw hole 74.

A disk-shaped guide portion 63 having a large diameter is formed on the upstream side of the conical portion 61 of the valve body 60. The guide portion 63 is adjacent to the base end of the conical portion 61, radially projects outward and is fitted such that the outer peripheral surface slides on the guide sleeve 25 of the valve seat 20. Concentricity of the valve body 60 and the valve seat 20 with the center axis O is ensured by fitting the guide portion 63 into the guide sleeve 25.

The guide sleeve 25 is formed with a cutout 26. An upstream space and a downstream space of the guide portion 63 communicate through the cutout 26. Instead of the cutout 26, it is also possible to form a through hole penetrating through the guide portion 63 to allow communication between the upstream and downstream sides of the guide portion 63.

Referring to FIG. 1 again, the valve body 60 further comprises a guide pin 64 projecting toward the upstream side from the guide portion 63. The valve housing 70 is formed with a guide hole 78 at a part corresponding to the bottom of the passage hole 73. The guide pin 64 penetrates the passage hole 73 from the guide portion 63 and the tip thereof is fitted into the guide hole 78 so as to be free to slide. The guide pin 64 makes concentricity of the valve body 60 and the valve seat 20 with the center axis O more reliable.

The outer periphery of the cylindrical plug 50 is threaded into the screw hole 74 of the valve housing 70.

The control pressure chamber 45 is constituted by an annular space around the plug 50. The piston 40 is formed with a conical recess 42 defining the control pressure chamber 45. The plug 50 enters the recess 42. By forming the recess 42, it is possible to ensure a sufficient volume for the control pressure chamber 45 and make the poppet valve 1 smaller.

The piston housing 80 is cylindrically formed and threaded onto the outer periphery of the valve housing 70. The piston 40 is fitted into the inner peripheral surface of the piston housing 80 via an O-ring 41 so as to be free to slide. A cap 85 is fastened to one end of the piston housing 80. The coiled spring 11 is interposed in a compressed state between the piston 40 and the cap 85.

A space formed by the piston 40 and the cap 85 to accommodate the spring 11 also functions as a back pressure chamber 46. An atmospheric pressure is introduced as a back pressure from the outside to the back pressure chamber 46 via a through hole not shown.

Next, the operation of the poppet valve 1 will be described. The fuel gas supplied from the fluid supply source to the primary port 71 as indicated by the arrow in FIG. 1 flows into the control pressure chamber 45 through the poppet upstream flow passage 31, the throttled flow passage 32 and the poppet downstream flow passage 33 forming the poppet passage 30 as indicated by arrows in FIG. 2. The fuel gas is further supplied from the control pressure chamber 45 to the fuel cell through the through hole 76 and the secondary port 77. In this process, the fuel gas flows in a rightward direction of FIGS. 1 and 2 around the valve body 60, has a flowing direction turned in the control pressure chamber 45, and flows in a leftward direction of FIGS. 1 and 2 through the through hole 76. By such setting of the flow passage, both the primary port 71 and the secondary port 77 can be arranged at one end of the valve housing 70 such that a growth in size of the poppet valve 1 is avoided.

On the valve body 60, a biasing force equivalent to a difference between spring forces of the springs 11 and 12 acts in the valve opening direction. Further, a biasing force due to a pressure difference between the control pressure chamber 45 and the back pressure chamber 46 acts in the valve closing direction. The valve body 60 is displaced to a position where these biasing forces are balanced, thereby increasing and decreasing the cross-sectional area of the throttled flow passage 32. As a result, resistance given to the flow of the fuel gas passing through the throttled flow passage 32 changes to adjust the pressures of the control pressure chamber 45 and the secondary port 77 to the set value.

For example, if the pressure of the control pressure chamber 45 becomes lower than the set value, the valve body 60 moves in the leftward direction in FIG. 1. This increases the cross-sectional area of the throttled flow passage 32 and the pressure of the control pressure chamber 45 increases to approach the set value. When the bottom surface 43 of the recess 42 of the piston 40 comes into contact with the end surface of the plug 50, any further displacement of the valve body 60 is restricted and the opening of the poppet valve 1 becomes the maximum. It should be noted that a flow passage not shown for the fuel gas is formed in advance between the inside and the outside of the plug 50 so as to ensure communication there-between even in the state where the bottom surface 43 of the recess 42 of the piston 40 is in contact with the end surface of the plug 50.

On the other hand, if the pressure of the control pressure chamber 45 becomes higher than the set value, the valve body 60 moves in the rightward direction in FIG. 1. This reduces the cross-sectional area of the throttled flow passage 32 and the pressure of the control pressure chamber 45 decreases to approach the set value. When the conical portion 61 comes into contact with the seat portion 22, any further displacement of the valve body 60 is restricted and the opening of the poppet valve 1 becomes zero to block the flow of the fuel gas.

At the maximum opening of the poppet valve 1 where the valve body 60 is displaced most in the leftward direction in FIG. 1, the end portion 28 of the seat portion 22 is located slightly to the right of the tip 65 of the conical portion 61. On the other hand, at the minimum opening of the poppet valve 1 where the valve body 60 is moved most in the rightward direction in FIG. 1, i.e. when the poppet valve 1 is closed, the end portion 28 of the seat portion 22 is located slightly to the left of the tip 65 of the conical portion 61.

In a prior art poppet valve, a flow velocity is increased by the passage of fuel gas through a throttled flow passage and a swirl may be possibly generated from the throttled flow passage to a downstream side thereof under a condition that a pressure difference before and after the throttled flow passage is large.

In contrast, by forming the throttled flow passage 32 in the form of a conical tube between the seat portion 22 and the conical portion 61, the fuel gas passing through the poppet valve 1 is rectified while flowing along the inner peripheral surface of the seat portion 22 and the outer peripheral surface of the conical portion 61. The generation of a swirl is suppressed by this rectification.

As described above, the noise level generated from the poppet valve 1 can be effectively reduced by setting the ratio S22/R22 of the length S22 of the seat portion 22 to the maximum radius R22 of the seat portion 22 at unity or higher based on the experimental result shown in FIG. 3.

The width of the throttled flow passage 32 is gradually increased from the upstream side toward the downstream side to gradually reduce the pressure of the fuel gas flowing in the throttled flow passage 32. This is preferable in enhancing an effect of rectifying the flow of the fuel gas and resistance given to the flow of the fuel gas by the throttled flow passage 32 is also suppressed.

This poppet valve 1 provides the following functions and effects.

(1) The seat portion 22 for allowing the passage of fluid and the conical portion 61 forming the throttled flow passage 32 together with the seat portion 22 are provided, and the inner peripheral surface of the seat portion 22 and the outer peripheral surface of the conical portion 61 defining the throttled flow passage 32 are formed into conical shapes concentric with the center axis O. This arrangement enables the throttled flow passage 32 to have a long distance. Accordingly, the throttled flow passage 32 can sufficiently rectify the flow of the fuel gas and the generation of a swirl is suppressed. The generation of noise from the poppet valve 1 due to the swirl of the fluid is thereby suppressed.

(2) Since the ratio S22/R22 of the length S22 of the seat portion 22 to the maximum radius R22 of the seat portion 22 is set at unity or higher, the throttled flow passage 32 in which the fuel gas passing through the poppet valve 1 flows along the inner peripheral surface of the seat portion 22 and the outer peripheral surface of the conical portion 61 has such a length that an rectifying action can be sufficiently exhibited. Since the rectifying action effectively functions, the generation of a swirl is suppressed. Thus, a phenomenon in which noise is generated from the poppet valve 1 due to the swirl of the fluid can be prevented.

(3) In the longitudinal sections of the seat portion 22 and the conical portion 61 including the center of axis O, the angle θ61 between the two straight lines A61 corresponding to the outer peripheral surface of the conical portion 61 is set to be larger than the angle θ22 between the two straight lines A22 corresponding to the inner peripheral surface of the seat portion 22 by the predetermined angle or more. Since this causes the cross-sectional area of the throttled flow passage 32 to gradually increase toward the downstream side, the pressure of the fuel gas flowing through the throttled flow passage 32 is gradually reduced. As a result, the effect of rectifying the flow of the fuel gas can be enhanced. Further, a total resistance that the throttled flow passage 32 exerts on the flow of the fluid can be suppressed (4) Since the end portion 28 of the seat portion 22 is formed at the position substantially facing the tip 65 of the conical portion 61 at least at the minimum opening, the throttled flow passage 32 is formed by effectively using up to the tip 65 of the conical portion 61. Such setting is useful in ensuring the length of the throttled flow passage 32 and provides a preferable effect also in making the poppet valve 1 compact.

(5) Since the throttled flow passage 32 extends up to the vicinity of the rod 62, the length of the throttled flow passage 32 can be ensured. As a result, the fluid flowing toward the control pressure chamber 45 through the throttled flow passage 32 is sufficiently rectified by flowing along the inner peripheral surface of the seat portion 22 and the outer peripheral surface of the conical portion 61, whereby the generation of a swirling flow is suppressed.

(6) The poppet valve 1 comprises the guide portion 63 connected to the base end side of the conical portion 61 and radially projecting outward. The guide sleeve 25 is connected to the seat portion 22 and extends in the axial direction of the conical portion 61. The guide portion 63 is inserted into the guide sleeve 25 so as to be free to slide. The conical portion 61 is thereby held at a position concentric with the seat portion 22 via the guide portion 63 and the radial width of the throttled flow passage 32 in the form of a conical tube is uniformly maintained over the entire circumference. As a result, a disturbance is unlikely to occur in the flow of the fuel gas in the throttled flow passage 32, and the noise generation of the poppet valve 1 can be more reliably prevented.

The contents of Toucan 2012-59446, with a filing date of Mar. 15, 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, a mechanism that drives the conical portion 61 to open and close the poppet valve 1 is not limited to the piston 40 operated by the pressure of the fuel gas. Any other actuator may be employed for this purpose.

Further, the fluid as an object of pressure reduction by the poppet valve 1 is not limited to fuel gas and may be any fluid.

The poppet valve according to this invention brings about a particularly preferable effect in preventing noise of a fuel gas pressure-reducing valve of a fuel cell system.

The embodiments of this invention in which an exclusive property or privilege is claimed are defined as follows.

The invention claimed is:

1. A poppet valve, comprising:
a seat portion which has a conical inner peripheral surface with a center axis; and
a conical portion which is supported at a position concentric with the seat portion and displaceable along the center axis inside the seat portion while forming a flow passage having an annular cross-section between the conical portion and the seat portion,
wherein, in a longitudinal cross-section of the poppet valve along a plane including the center axis,
an apex angle of the conical portion is formed between two straight lines corresponding to an outer peripheral surface of the conical portion,
an apex angle of the inner peripheral surface of the seat portion is formed between two further straight lines corresponding to the inner peripheral surface of the seat portion, and
the apex angle of the conical portion is greater than the apex angle of the inner peripheral surface of the seat portion,
wherein the poppet valve is configured for a fluid to flow through the poppet valve in the flow passage in a direction in which a diameter of the conical portion decreases, and
wherein a cross-sectional area of the flow passage gradually increases toward a downstream side of the flow passage.

2. The poppet valve according to claim 1, wherein a ratio of a length of the seat portion along the center axis to a maximum radius of the seat portion is 1 or higher.

3. The poppet valve according to claim 1, wherein a downstream tip of the seat portion is located in a vicinity of a tip of the conical portion in a state where the conical portion is seated on the seat portion.

4. The poppet valve according to claim 1, further comprising:
a control pressure chamber which is formed at the downstream side of the flow passage;
a piston which is displaceable along the center axis according to a fluid pressure in the control pressure chamber; and
a rod which couples the conical portion and the piston.

5. The poppet valve according to claim 1, wherein
the conical portion comprises a large-diameter side end portion,
the poppet valve further comprises a guide portion which is connected to and radially projects from the large-diameter side end portion, and
the seat portion comprises a guide sleeve which holds an outer periphery of the guide portion, and the guide portion is freely slidable inside the guide sleeve along the center axis.

6. The poppet valve according to claim 1, wherein the conical portion is configured to be seated on an upstream edge of the seat portion when the poppet valve is closed.

7. The poppet valve according to claim 1, wherein the apex angle of the conical portion and the apex angle of the inner peripheral surface of the seat portion are acute angles.

8. A poppet valve, comprising:
a seat portion which has a conical inner peripheral surface with a center axis; and
a conical portion which is supported at a position concentric with the seat portion and displaceable along the center axis inside the seat portion while forming a flow passage having an annular cross-section between the conical portion and the seat portion,
wherein, in a longitudinal cross-section of the poppet valve along a plane including the center axis,
an apex angle of the conical portion is formed between two straight lines corresponding to an outer peripheral surface of the conical portion,
an apex angle of the inner peripheral surface of the seat portion is formed between two further straight lines corresponding to the inner peripheral surface of the seat portion,
the apex angle of the conical portion is greater than the apex angle of the inner peripheral surface of the seat portion,
wherein the poppet valve is configured for a fluid to flow through the poppet valve in the flow passage in a direction in which a diameter of the conical portion decreases,
wherein a ratio of a length of the seat portion along the center axis to a maximum radius of the seat portion is 1 or higher, and
wherein a downstream tip of the seat portion is located in a vicinity of a tip of the conical portion in a state where the conical portion is seated on the seat portion.

9. The poppet valve according to claim 8, wherein a cross-sectional area of the flow passage gradually increases toward a downstream side of the flow passage.

10. The poppet valve according to claim 8, further comprising:
a control pressure chamber which is formed at a downstream side of the flow passage;
a piston which is displaceable along the center axis according to a fluid pressure in the control pressure chamber; and
a rod which couples the conical portion and the piston.

11. The poppet valve according to claim 8, wherein
the conical portion comprises a large-diameter side end portion,
the poppet valve further comprises a guide portion which is connected to and radially projects from the large-diameter side end portion, and
the seat portion comprises a guide sleeve which holds an outer periphery of the guide portion, and the guide portion is freely slidable inside the guide sleeve along the center axis.

12. The poppet valve according to claim 8, wherein the conical portion is configured to be seated on an upstream edge of the seat portion when the poppet valve is closed.

13. The poppet valve according to claim 8, wherein the apex angle of the conical portion and the apex angle of the inner peripheral surface of the seat portion are acute angles.

14. The poppet valve according to claim 8, wherein the fluid is a fuel gas.

\* \* \* \* \*